United States Patent Office 3,534,383

Patented Oct. 13, 1970

3,534,383

METHOD OF ELECTROSTATIC RECORDING AND ELECTROSTATIC RECORDING APPARATUS

Kenmi Tsukatani, Tokyo, and Yoshihiko Kaiju, Akira Suzuki, Kiyoshi Takagi, and Kunihiko Tasai, Kawasaki-shi, Japan, assignors to Fujitsu Limited, Kawasaki, Japan, a corporation of Japan

Continuation-in-part of application Ser. No. 513,233, Dec. 13, 1965. This application Aug. 22, 1969, Ser. No. 852,445

Claims priority, application Japan, Dec. 14, 1964, 39/70,387

Int. Cl. G01d *15/06;* H04n *1/30*

U.S. Cl. 346—74 10 Claims

ABSTRACT OF THE DISCLOSURE

Electrostatic recording apparatus for recording facsimile intelligence comprises a plurality of record media in juxtaposed relation to each other. An energizing circuit is connected to a recording electrode positioned at one surface of the record media and to a counter electrode positioned at the opposite surface of the record media. The energizing circuit applies a first precharging voltage of predetermined polarity and a predetermined magnitude dependent upon the number and electrical characteristics of record media and having a magnitude. The energizing circuit also applies a second charging voltage of polarity opposite to the predetermined polarity. The combination of the first and second voltages is sufficient for electrostatically recording facsimile intelligence simultaneously in each of the plurality of record media.

DESCRIPTION OF THE INVENTION

The present application is a continuation-in-part application of copending patent application Ser. No. 513,233, filed Dec. 13, 1965, now abandoned and assigned to the assignee of this application.

The present invention relates to a method of electrostatic recording and electrostatic recording apparatus. More particularly, the invention relates to a method of recording distinct electrostatic latent images of high resolving power on all of a plurality of recording media by placing the recording media one upon another between two electrodes and impressing electric input signals between the electrodes. The principle of the recording method of this invention is characterized in that by the movement of the charged carrier corresponds in size to the electric input signals, the electric charge is bound firmly within the recording media and of record of excellent quality is available.

In the conventional electrostatic recording method, recording is performed by means of corona electrification of the surface of the dielectric, charge of the dielectric or internal polarization of the dielectric such as an electret which is used as the recording medium. In the recording method in accordance with this invention, recording is performed by means of the electrostatic latent images which are formed by injecting the charged carrier into the interior of the recording medium by making the charged carrier traverse the barrier layer at the surface of the medium and move into beneath the surface or ejecting the charged carrier out of the interior of the recording medium under the effect of the electric field and by binding the above state. The latent image formed in this invention is bound semi-permanently and differs from the latent image formed by means of corona electrification and others in that it is not easily erased even if the area in which it is formed is swept by the grounding metal, etc., and that it has the direction of the electric field given by its polarity. In other words, the fundamental principle on which the present invention is based is the general characteristic of the dielectric that it is essentially different from the charging record in that positive electrostatic charge appears at the surface of the recording medium which is in contact with the positive electrode. This characteristic can be easily and obviously observed when the dielectric thin film is used.

A dielectric thin layer is placed between a pair of electrodes, one of which acting as the electrode for applying the electric input signal while the other acting as the counterelectrode, and when the electric field is applied between the electrodes so as to traverse the dielectric thin layer and the voltage of the input signal is raised gradually up to a certain voltage (hereafter referred to as the critical voltage), movement of the charged carrier is caused in the dielectric thin layer, the volume of the ing the critical voltage. Moreover, in the area of the dimovement being approximately proportional to the volume of the electric field produced by the voltage exceedelectric wherein the movement of the charged carrier has been once caused under a certain electric field, the movement of the charged carrier is not caused again even if the same electric field is reapplied, but when the electric field of the same volume as the first applied electric field, but of the different polarity, that is, of the opposite direction, is applied, the movement of the charged carrier of about double volume of the first movement is observed. It is easily inferred that the movement of the charged carrier within the dielectric thin layer caused by the electric input signal above the critical voltage means injection and ejection of the movable electric charge and that this state is bound within the layer. Since the charged carrier moves traversing the electrodes and the dielectric including the barrier layer at the surface thereof, the critical voltage varies in accoradnce with the property of the electrodes even if the property of the dielectric used is not changed.

In order that the invention may be readily carried into effect, it will now be described with reference to the accompanying drawings, wherein.

Figure 1:
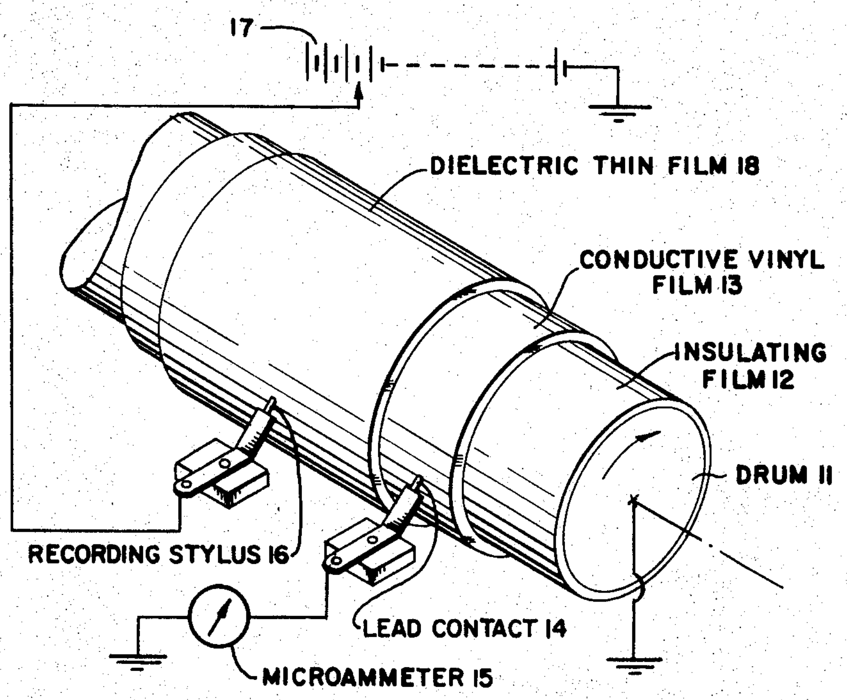
FIG. 1 is a schematic diagram, in perspective, of apparatus utilized to perform the experiment providing the basis for the method of the present invention.

FIG. 1 illustrates the equipment whereby the above-described movable current may be readily observed in the form of a steady-state current. Freely rotatable, metallic and cylindrical drum 11 is wound by a flexible film 12 made of a highly-insulating material, which is wound by a flexible and conductive vinyl film 13, and a lead contact piece 14 is fixed always in contact with one side of film 13 and is grounded through a microammeter 15. The conductive vinyl sheet 13 is wound by the dielectric thin layer 18 to be measured which is narrower in width than sheet 13, and a recording needle 16 connected with power source 17 is attached in contact with the layer 18 always at a constant pressure. Simultaneously with rotation of drum 11 in the arrow-marked direction, recording needle 16 is moved at a constant speed in the axial direction of the cylindrical drum 11 so that the needle may scan spirally the dielectric thin layer to be measured. If the speed of scanning is properly adjusted and the recording needle 16 is prevented from being affected by the formerly scanned portion, and the current which passes through the dielectric thin layer apparently is read by ammeter 15, it is clarified that the current is constantly related with a volume which is proportional to the movement of the charged carrier caused within the dielectric thin layer.

If the different voltages are applied successively to various dielectric which are wound on the above-described simple equipment and the relation between these voltages and the currents read by the ammeter is requested, it is seen that each dielectric has a critical voltage of a certain value at which the current begins to increase sharply. Movement of the charged carrier within the dielectric caused by the application of the voltage above the critical voltage is bound in the area wherein the movement occurs and the changed portion and the unchanged portion are distinguished from each other faithfully depending on the applied electric fields, with the result that the firm and distinct electrostatic latent image is available.

The main characteristics of the electrostatic latent image thus available are as follows:

(1) The critical voltage exists and the latent image is not formed when the applied voltage is lower than this voltage.

(2) The polarity of the electric charge on the dielectric thin layer represents the direction of the electric field and the homocharge is seen. That is, the positive electrostatic charge appears at the surface of the dielectric which is in contact with the positive electrode.

(3) The electric charges which appear at both surfaces of the dielectric thin layer have polarities which are opposite to each other.

(4) The electric charge is not easily erased even if it is swept by the grounding metal, etc.

(5) The latent image does not undergo change even if it is preserved for a long time.

These characteristics are observed in all kinds of dielectrics, but it has been found that particularly from the practical viewpoint, these characteristics are easily controllable in dielectrics of the thickness of within 60 microns.

The above characteristic will be explained in detail in an embodiment of the apparatus. A tungsten wire of the diameter of 0.15 mm. is used as recording needle 16 in FIG. 1 and a polyethylene terephthalate film is used as dielectric thin layer 18. The relations between the applied voltages and the currents which flow through ammeter 15 are shown in FIGS. 2, 3, 4 and 5. In these graphs, the abscissa indicates the voltages applied to recording needle 16 and the ordinate indicates the currents which flowed correspondingly and the points available are combined lines.

Figure 2:
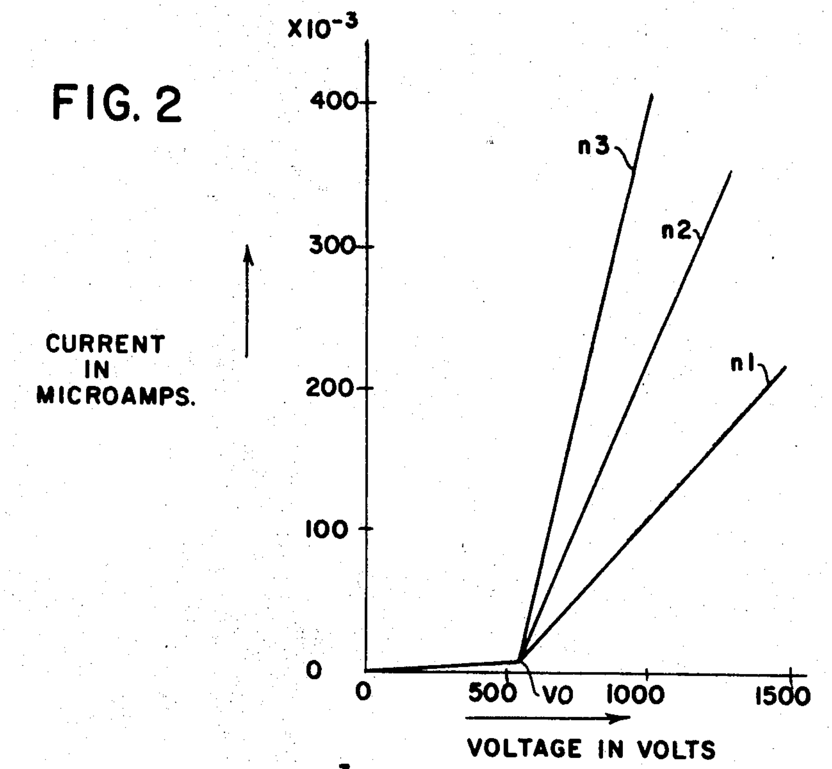

FIG. 2 shows the curves when a polyethylene terephthalate film of the thickness of 12.7 microns is used and the numbers of rotation of the cylindrical drum 11 are $n_1$=70 r.p.m., $n_2$=170 r.p.m. and $n_3$=340 r.p.m. When the applied voltages are lower than the critical voltage $V_L$, the currents are very small and when the applied voltages are above $V_L$, the currents increase almost in proportion to the revolutions per minute or numbers of rotation. $V_L$'s of the three cases coincide with each other, indicating that $V_L$ has no relation with the number of rotation. For this reason, only the volt-ampere relations in the case of $n_2$=170 r.p.m. will be explained after FIG. 3.

Figure 3:
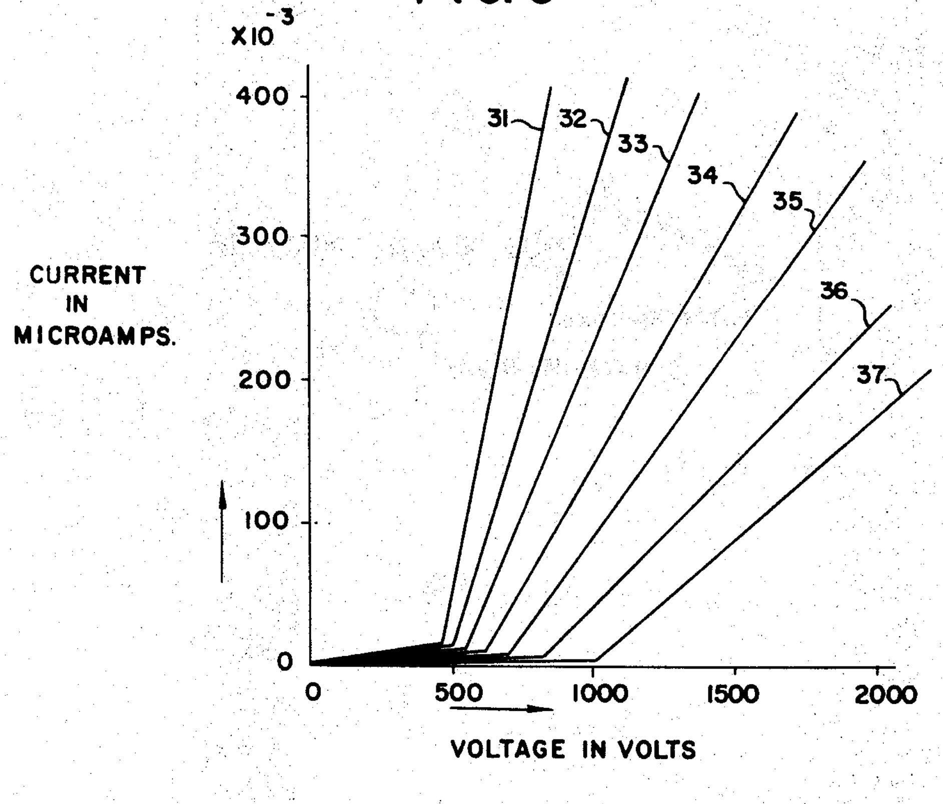
FIGS. 2 to 9 are graphical presentations of the voltage-current relation in various types of recording media measured by the apparatus of FIG. 1.

FIG. 3 shows the characteristics of polyethylene terephthalate films of different thicknesses. Curve 31 represents volt-ampere relation of a 6 micron film; 32, a 9 micron film; 33, a 12.7 micron film; 34, a 18 micron film; 35, a 27 micron film (comprising three 9 micron films placed one upon another); 36, a 36 micron film (comprising two 18 micron films placed one upon another); and 37, a 50 micron film. It is seen from FIG. 3 that the critical voltages vary in accordance with the thicknesses of the films and that the movement of the charged carrier is caused when the electric field is above a certain value.

In a polyethylene terephthalate film, where the voltage applied to the recording needle is V, the current which flows is J millimicroampere and the thickness of the film is $\delta$ microns, the equations are:

$$J=K_1\left(\frac{V-V_L}{\delta}\right)$$

and $$V_L=Vo+K_2\delta$$

Hence, $Vo$=380 volts and $K_2$=1.25.

Furthermore, when a plurality of films are placed one upon another as in the case of the films of the total thicknesses of 27 microns and 36 microns, represented by curves 35 and 36, respectively, in FIG. 3, the same result was available as in the case of a single film. When these films constituting a thicker film are separated into single sheets, electric charges which appear at both surfaces of each film form the electrostatic latent images of the same property as the case of applying the electric field to only a single sheet of film.

Figure 4:
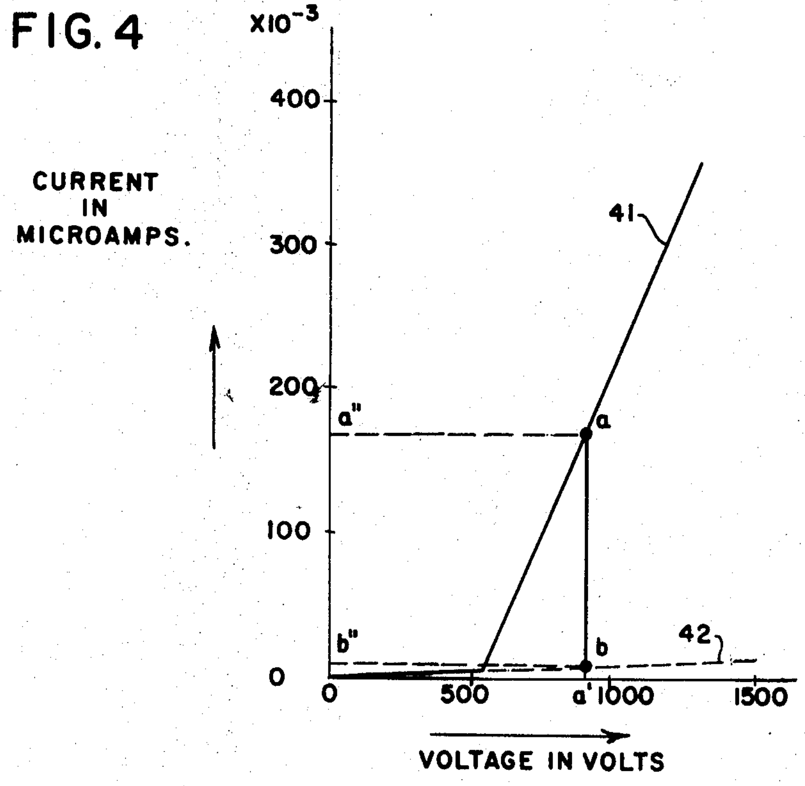
Figure 5:
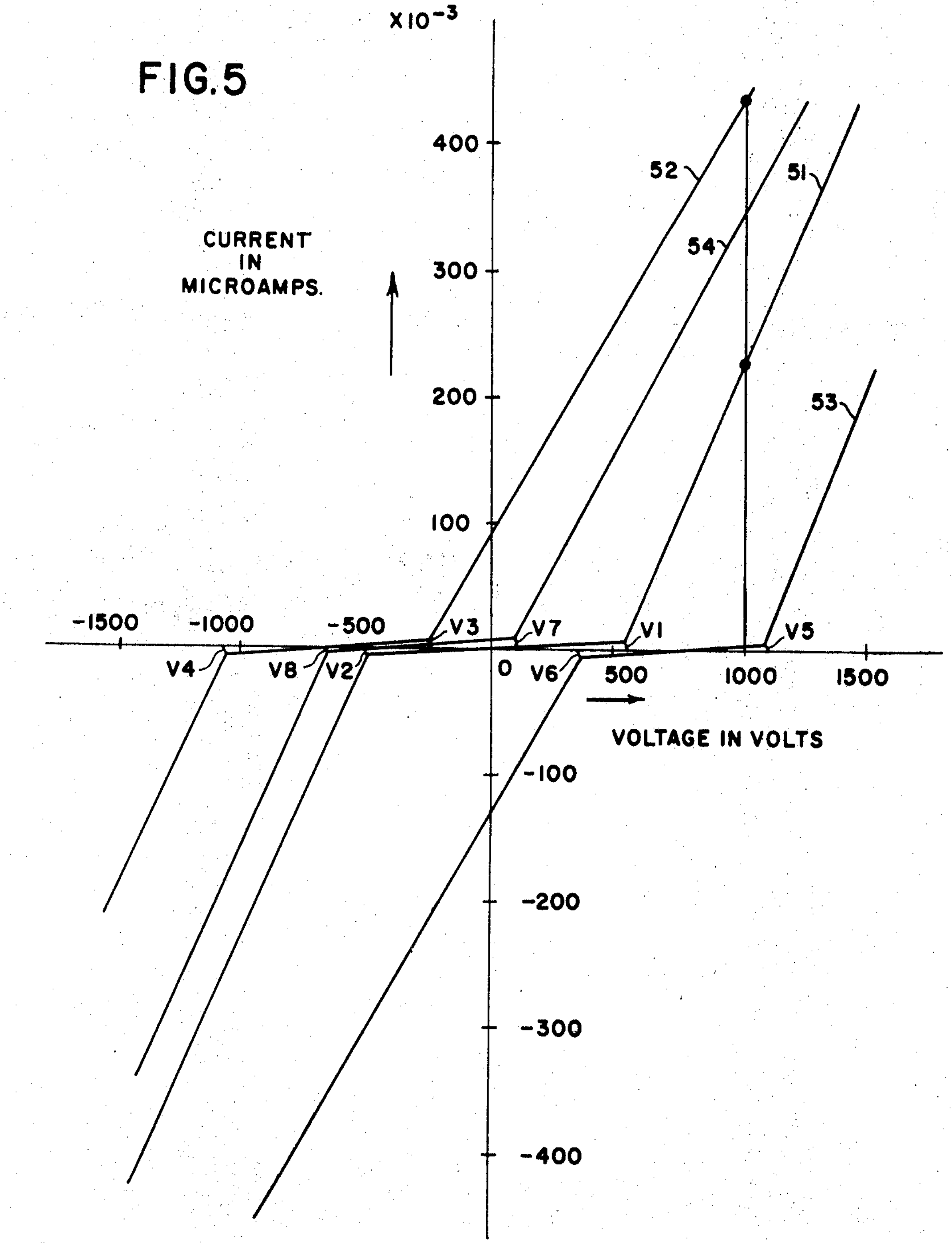

It will be further seen from FIGS. 4 and 5 that the characteristic of the present invention is different from the charging current in a capacitor, etc. FIGS. 4 and 5 show that the effect of an electric field capable of causing movement of the charged carrier in a dielectric thin layer differs according to what a previous history the layer had before the electric field is applied, i.e., what kind of electric field affected the layer previously. FIG. 4 shows the characteristic of a polyethylene terephthalate film of the thickness of 12.7 microns. Curve 41 represents the volt-ampere relation available when the voltage is applied to an uncharged film which was not previously affected by any electric field, whereas 42 represents the relation between a voltage applied to a film to which a voltage of the same value as the above voltage has been previously applied as in the case of 41 and secondly flowing current.

For example, point *a* in FIG. 4 indicates current *a''* millimicroampere, which flows when voltage *a'* volts, is first applied, and point *b* indicates current *b''* millimicroampere, which flows when *a'* volts is applied again to the same area of the film. It may be considered that the charged carrier which moved under the application of an electric field is bound in the area wherein the movement occurred and the charged carrier movable under the electric field of a certain strength is completely moved by the first application of the electric field, so that even if the electric field is applied again to the same area, the movement ceases.

FIG. 5 shows the general form of the volt-ampere characteristic of the polyethylene terephthalate film of the thickness of 12.7 microns. Curve 51 represents the characteristic available when the electric field is applied to a new film, that is, an uncharged film without previously applied fields, the right side of OV of the horizontal axis indicating the case of applying the positive voltage to recording needle 16 and the left side indicating the case of applying the negative voltage. Curve 52 represents the relation between the voltage indicated by the abscissa applied through recording needle 16 to a film to which a voltage of −1085 volts has been previously applied through needle 16, and the secondly flowing current, and 53 represents the relation between the voltage indicated in the abscissa applied to a film to which a voltage of +1085 volts has been previously applied and the secondly flowing current. In each of the curves, the vertical voltages where the current increase sharply are indicated by $V_1$, $V_2$; $V_3$, $V_4$; and $V_5$, $V_6$ at the right and left sides of the drawing. For example, the right-hand critical voltage of a film which has no previous history is indicated by $V_1$ and the right-hand critical voltage of a film to which −1085 volts has been previously applied is indicated by $V_3$. It is seen that in the latter case, by the application of the voltage to the right of point $V_3$, it is possible to move a part of the charged carrier bound in the film by the previous application of the voltage of −1085 volts. This means that if the electric input signal of the voltage to the right of point $V_3$ is applied after the previous application of −1085 volts, movement of the charged carrier corresponding to the applied signal is caused and this makes it possible to record the electric input signal. A similar record becomes possible at the left side of the curve when the absolute value of the electric input signal exceeds that of the critical voltage.

The conditions of the formation of an electrostatic latent image in a single dielectric film by the movement of the charged carrier therein under the effect of an electric field have been described above. Next, a recording medium having recording layers of two layers structure or three layers structure produced by forming thin layers of high-insulating material on one or both surfaces of an ordinary paper as a base body, also has the critical voltage of a certain value where the movement of the charged carrier is caused by the application of the voltage, and electrostatic latent images which are proportional to the strength of the voltage exceeding the critical voltage are produced in the recording layers. It was found that similarly when the voltage is applied simultaneously to a plurality of recording media, placed one upon another, electrostatic latent images corresponding to the voltage exceeding the critical voltages are produced on the recording layers of each recording medium.

An example of the above-mentioned volt-ampere relation actually measured will be described with reference to FIGS. 6, 7 and 8. The recording medium used comprises a matted tracing paper having a thickness of 40 microns and a styrene layer of the thickness of 1 to 2 microns formed on the surface of the paper by painting thereon a 5% solution of styrene in toluene with the doctor gap of 0.15 mm. and drying it. The relations between the voltages applied through recording needle 16 to the above-described recording medium wound as the recording medium 18 on the equipment in FIG. 1 and the currents which flow correspondingly are shown in FIGS. 6 to 8.

Figure 6:
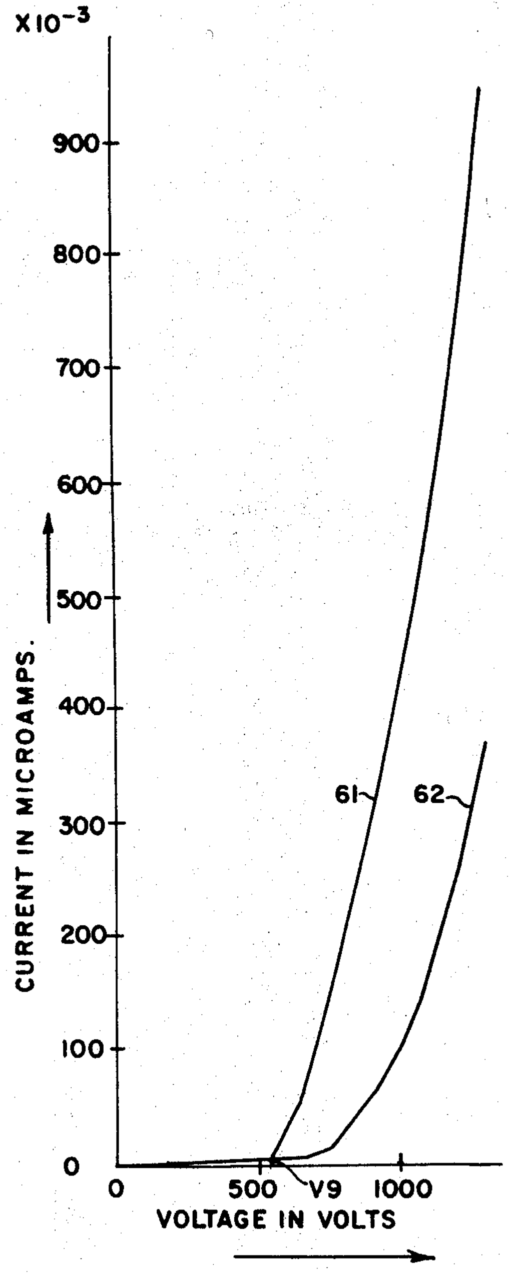
Figure 7:
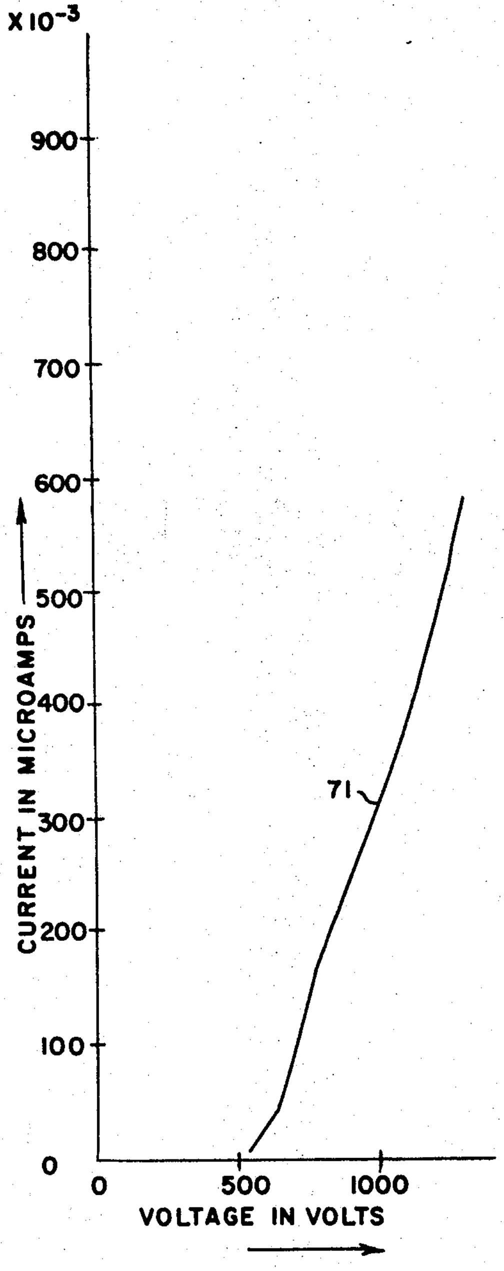

As shown by curve 61 in FIG. 6, the recording medium has the critical voltage $V_L$ of a certain value where the current increases sharply by the application of the voltage, and just as in the case of a single dielectric thin layer, the current increases by the application of the voltage exceeding $V_L$. When the voltage is applied to a recording medium to which a voltage of the same value has been once applied, a curve extending a little lower than curve 61 is available, and when the application of the same voltage is repeated eight times, the value represented by curve 62 is available and thereafter, however often the same voltage is applied, the same value of current of curve 62 is available. Accordingly, when the value of curve 62 is subtracted from that of curve 61, curve 71 shown in FIG. 7 is available, which has completely the same shape as the curve of a single dielectric thin layer.

Although the manner of change is a little different from the case of a single dielectric thin layer, the above-mentioned recording medium finally takes a form whereafter there is no more change in current, by changing from curve 61 to curve 62. This characteristic results from the property of the paper which is the holder of the recording medium on which the highly-insulating material is formed and it may be considered that the characteristic is seen because one application of a voltage is not enough to move all the charged carriers movable by the same voltage and a part of the charged carriers remains.

Figure 8:
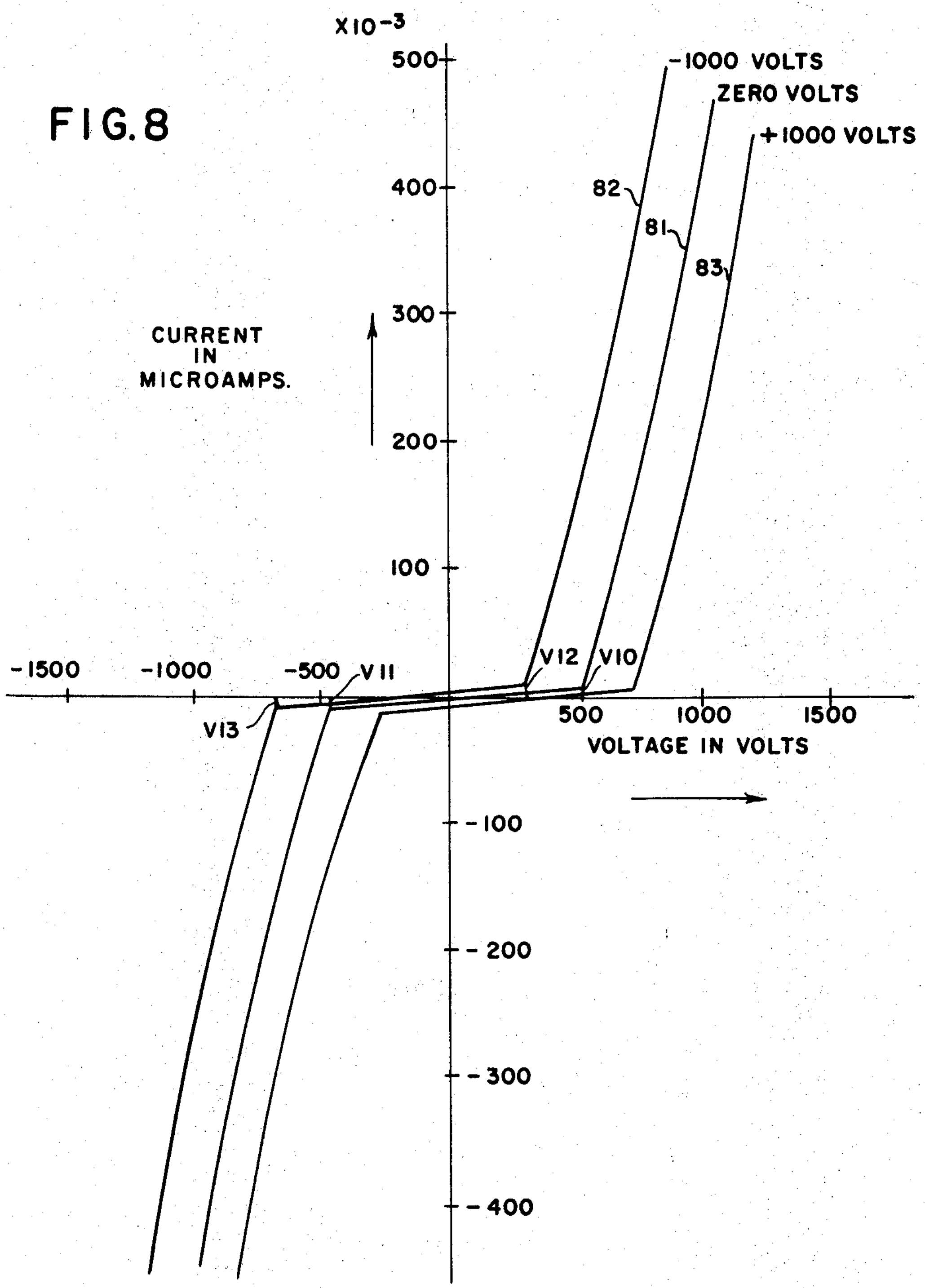

In FIG. 8, curve 81 represents the volt-ampere characteristic available when positive or negative voltage is applied through recording needle 16 shown in FIG. 1 to a recording medium whose holder is a paper to which no electric field has ever been applied, curve 82 represents the volt-ampere characteristic available when positive or negative voltage is applied to the medium to which −1085 volts was first applied as the previous history, and curve 83 is the characteristic available when +1085 volts was first applied.

Critical voltages $V_{L1}$ and $V_{L2}$ in curve 81 are $V_{L1}=500$ volts and $V_{L2}=-460$ volts, and when voltages the absolute values of which are larger than the absolute values of the critical voltages are applied, the bound electrostatic latent images produced by the movement of the charged carriers are formed on the recording medium. In curve 82, available by applying the voltage indicated in the abscissa to a recording medium to which the voltage of −1085 volts was previously applied, critical voltage $V_{L3}$ is available at the positive side and $V_{L4}$ is available at the negative side, with the result that curve 82 is available by shifting curve 81 leftward, that is, to the negative voltage side, and the relations, $V_{L1}>V_{L3}$ and $V_{L2}>V_{L4}$, are in effect. This means that when the absolute values of the voltages of the electric input signals exceed the absolute values of $V_{L3}$ and $V_{L4}$, the electrostatic latent images are produced. Similarly, curve 83 is available by shifting curve 81 rightward, and as in the case of curve 82, electrostatic latent images are produced when the absolute values of the input signal voltages exceed the absolute values of the critical voltages.

Figure 9:
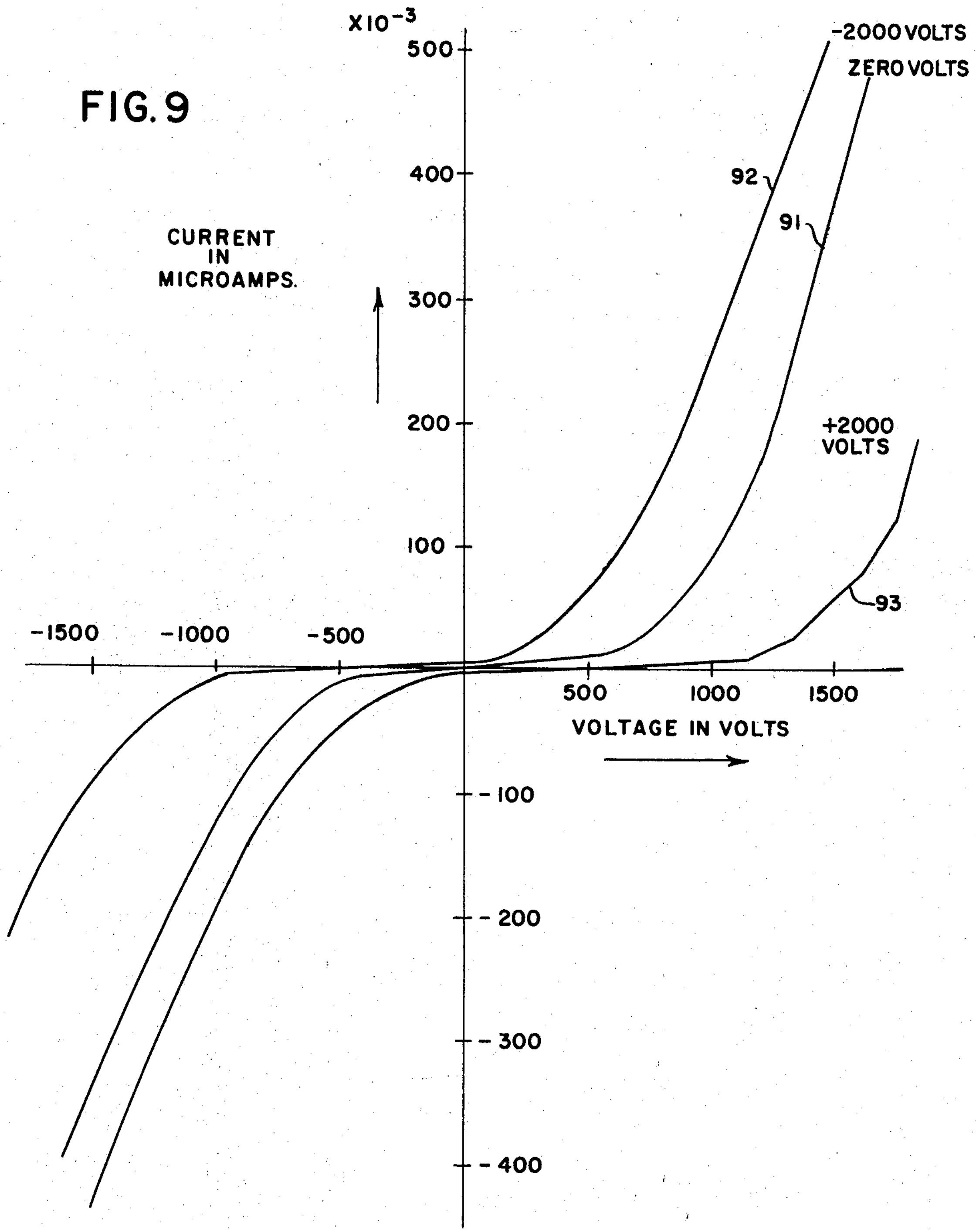

FIG. 9 shows the volt-ampere relations available when two recording media of the type used in providing the curves of FIG. 8 are placed one upon another. In this case, two recording media are used, that is, two sheets of paper are used as the holding layers, so that by the effect of the electric field applied to these layers, the rising of the parts of the curves which indicate the critical voltages is slow, but the parts of the curves where the currents increase sharply and the state of the shift of the critical voltages because of the previous applications of the recording media can be observed. Curve 91 is the characteristic available when the voltage is applied to two recording media, without previous voltage applications, placed one upon another, curve 92 is the characteristic available when the voltage is applied to two recording media with the previous application of about −1000 volts placed one upon another, and curve 93 is the characteristic available when the voltage is applied to two recording media with the previous application of about +1000 volts placed one upon another. If the paper used as the holder in the recording medium which was the object of the above measurement is used, alone, it is impossible to produce the electrostatic latent image by the application of the voltage, as described above. This means that a paper without any work thereon cannot be used as a recording medium.

When a plurality of the above-mentioned single dielectric thin layers used as the recording media or a plurality of recording media produced by forming thin layers of highly-insulating material on one or both surfaces of an ordinary paper as the holder, are placed on upon another and are held between the electrodes, and the electric input signal is applied, a critical voltage value is available as a constant of said plurality of recording media, and when the voltage exceeding the critical voltage is applied, electrostatic charge images representing the electric input signals are produced. However, when said plurality of recording media placed one upon another are separated into single sheets, handling or exfoliation produces electrification by friction and the electrostatic charge images corresponding to the input signals are destroyed, so that it is impossible to obtain distinct images of high resolving power.

As shown in FIGS. 2 to 8, when the voltage under the critical voltage of a recording medium (the critical voltage of a recording medium) with a previous voltage application being shifted from that of the uncharged recording medium without a previous voltage application is applied to the recording medium, movement of the charged carrier is not caused and accordingly the electrostatic latent image is not produced, nor is the previously produced electrostatic latent image destroyed. It is effective, therefore, to utilize such voltage to erase the surface electric charge produced in the paper or dielectric thin layer by electrification produced by friction or by exfoliation or handling. For example, the above-mentioned electrification of the paper or dielectric thin layer may be neutralized by the neutralizing effect of ions under the AC corona discharge in such a manner that after the formation of the electrostatic latent image by the application of the voltage exceeding the critical voltage described in the present invention, the neutralizing effect of the AC corona ion where the voltage of the AC corona discharged becomes lower than said critical voltage at the surface of the recording medium, is utilized to erase the electrification caused by exfoliation or handling or friction in the recording medium.

Characteristics available when the voltage is applied to a single dielectric thin layer or a recording medium produced by forming dielectric thin layers on one or both surfaces of an ordinary paper as a holder, have been described in detail in the foregoing. When a plurality of these recording media are placed one upon another and the voltage is applied to them simultaneously, the similar electrostatic latent images are produced on both surfaces of each of said recording media by the movement of the charged carriers, but this method has a defect that, as described above, when the plurality of recording media forming one sheet are separated into the single sheets, the electrostatic latent images produced by the electric input signals are destroyed due to electrification caused by exfoliation, handling or friction. For this reason, in order to produce distinct electrostatic latent images by electric input signals on each of the layers placed one upon another by means of this method, it is necessary to obviate the above defect by the methods as described in detail in our copending U.S. patent application, Ser. No. 379,-974, in addition to the use of the above-mentioned method of neutralization by the AC corona ions.

It was also found that it is possible in accordance with the present invention to produce a distinct electrostatic latent image on a single dielectric thin layer by forming on one surface thereof a conductive layer of the surface resistance of $10^{10}$ to $10^{14}$ ohms. In general, rising of the electric potential on the surface of a dielectric film caused by frictional electrification or generation of static electricity may be checked by providing a metallic or conductive thin layer on one surface of the film or between the films. Such checking is achieved almost completely if the volume resistivity of the conductive layer is under $10^9$ ohm cm. However, in the case of recording simultaneously on a plurality of layers, it is necessary that the electric field formed by the application of the electric input signal on the plurality of recording media placed one upon another, should not be obstructed by the conductive layer but be passed through all the layers, and yet the conductive layer should prevent rising of the electric potential on the recording layers due to electrification caused by exfoliation, handling or friction. In order to satisfy this condition in the present invention, it is important that the surface resistance of the conductive layer should be within the range of $10^{10}$ to $10^{14}$ ohms.

Figures 10, 11:
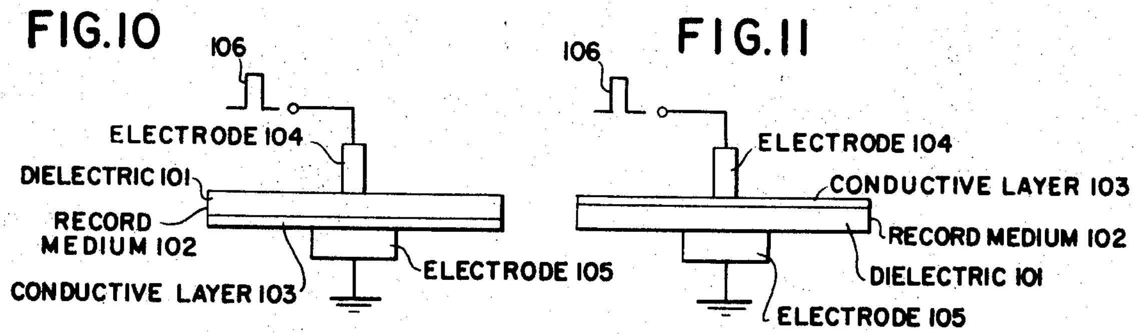
FIGS. 10 and 11 are schematic diagrams of the recording media and the electrodes for accomplishing the recording method of the present invention.

In FIG. 10, a recording medium 102, produced by providing a conductive layer 103 as described above on a dielectric film 101, is placed between a pair of electrodes 104 and 105, and electric input signal 106 is applied to electrode 104, which is in contact with dielectric film 101. The other electrode 105 in contact with conductive layer 103 is grounded and a relative displacement is given to recording medium 102 as against electrodes 104 and 105. Then, a signal with an amplitude of a value exceeding the critical voltage is applied to said recording medium. In this case, an electrostatic latent image corresponding to the signal is produced on dielectric 101 of recording medium 102, but the image is not available on the surface of conductive layer 103.

When the recording medium 102 is turned over between the electrodes as shown in FIG. 11, an electrostatic latent image of the opposite polarity to the case of FIG. 10 is available on the surface of dielectric 101 of the recording medium. This means that when the electric input signal is applied simultaneously to a plurality of recording media placed one upon another, electrostatic charge image is not available on the surface of each recording medium which is provided with the conductive layer, but the image is available on the surface which is not provided with the conductive layer. Accordingly, the purpose of the conductive layers on a plurality of electrostatic recording media for simultaneous record thereon is different from the purpose of the conductive layer on a single electrostatic recording medium, and it is necessary that the surface resistance of the conductive layers on a plurality of recording media for simultaneous record thereon should be $10^{10}$ to $10^{14}$ ohms.

Figures 12, 14:
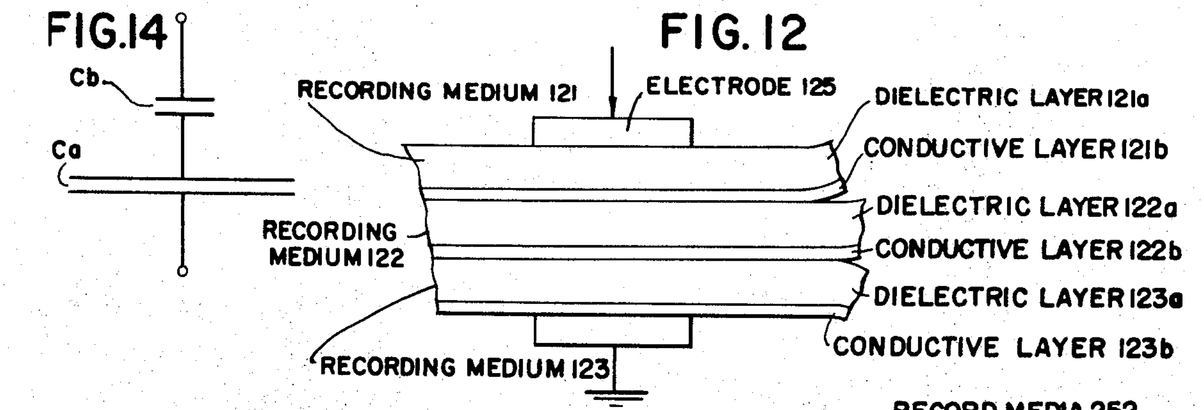
FIG. 12 is a schematic diagram of a plurality of recording media placed one upon another for simultaneous recording thereon.
FIGS. 13 and 14 are equivalent circuit diagrams of the recording media of FIG. 12.

The property of the conductive layers on a plurality of recording media for simultaneous record thereon is described more specifically with reference to FIG. 12. Recording media 121, 122 and 123, each of which comprising a dielectric thin layer *a* for record thereon and a conductive layer *b* provided on the back surface of layer *a*, are placed one upon another on counterelectrode 124 in such way that the dielectric thin layer *a* for record thereon of each recording medium should be more distant than the conductive layer from the electrode 124, and voltage V is applied to the media through letter electrode 125 represented by the arrow mark.

Figures 13, 15, 23:
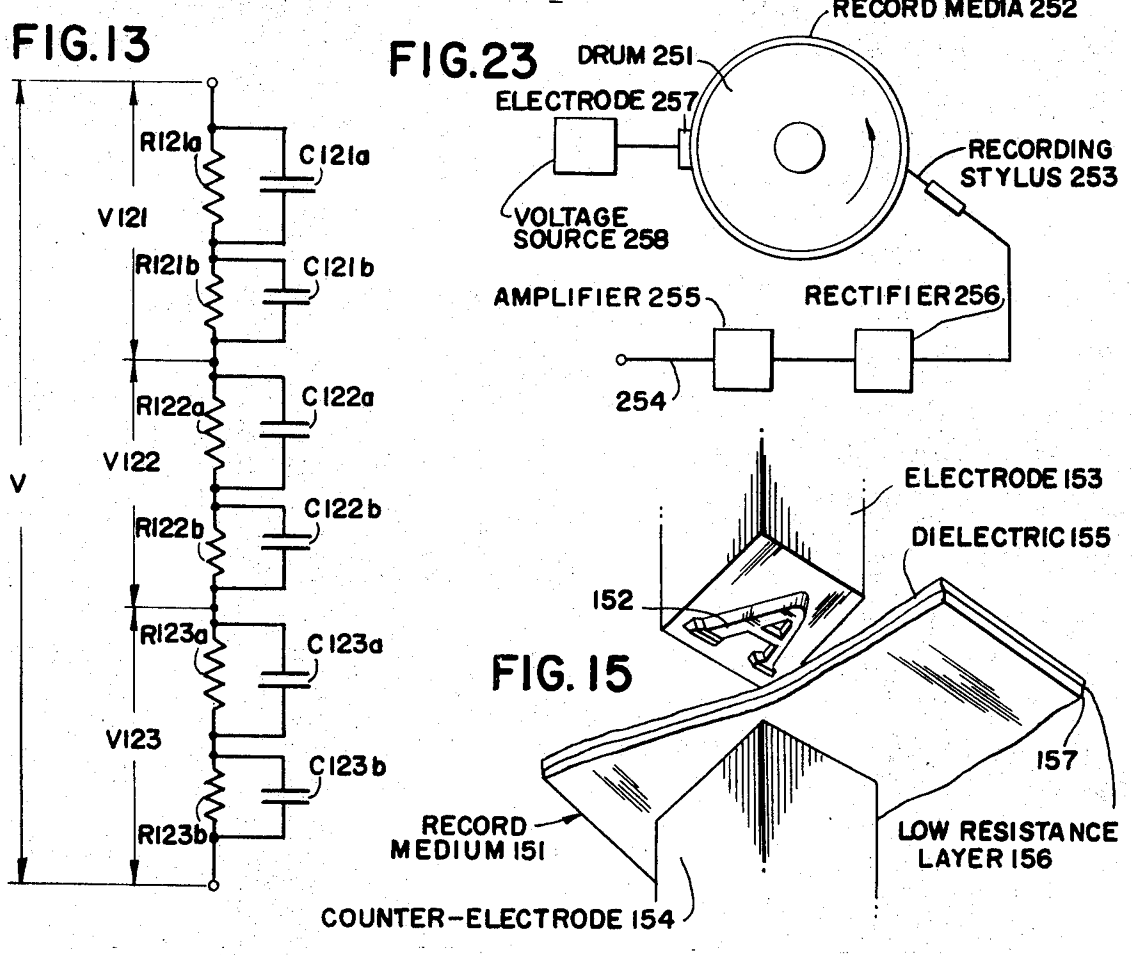
FIGS. 15 to 18 are schematic diagrams illustrating the relation between one or more recording media for recording, the electrodes and the state of the electric field.
FIG. 23 is a schematic diagram of the recording apparatus of the present invention applied to facsimile transmission.

Then, the electric field is formed on each single recording medium with the voltage distribution of $V_1$, $V_2$ and $V_3$, as shown in FIG. 13, and recording media 121, 122 and 123 may be illustrated by equivalent circuits each of which comprising resistance $r_a$ and capacity $c_b$ of the conductive layer *b*. If the resistance of the conductive layers *b* is very low at this time, the electric field applied to the recording medium 121 which is nearest to the letter electrode is obstructed by the conductive layer *b* of the medium 121 and the electric field of the shape formed by the letter electrode is not passed to recording media 122 and 123.

Furthermore, as shown in FIG. 14, capacity C produced by the conductive layer of recording medium 121 and the counterelectrode becomes far greater than capacity *c* produced by said conductive layer and the letter electrode, with the result that most of the voltage is applied to the latter. Therefore, in this case, the electrostatic charge image is formed only on the recording surface of the first recording medium, that is, the recording medium 121 in FIG. 12. If the surface resistance of the conductive layers is made $10^{10}$ to $10^{14}$ ohms, the above defect is obviated and electrification by handling or exfoliation is prevented, with the result that distinct electrostatic latent images are produced on all of the recording media.

When use is made of an electrostatic recording medium comprising an ordinary paper as the holder and a dielectric thin layer of highly-insulating material for record thereon provided on said paper, the volume resistivity of the paper varies in accordance with the humidity of the air. When the humidity is above 85% RH or under 10% RH, the volume resistivity becomes under $10^9$ ohm.-cm. or above $10^{15}$ ohm.-cm., respectively. This means that in recording on a single sheet of the above-described electrostatic recording medium, the low volume resistivity of the paper under the humidity of above 85% RH causes no fault, but in the case of recording on a plurality of said recording media placed one upon another, the papers whose resistance is lowered by humidity obstruct the electric field produced by the application of the voltage, so that record is produced only on the first recording medium.

When the humidity is under 10% RH, the resistance of the paper as the holder is high so that records may be made on all of the plurality of recording media, but in this case, when these recording media are separated into single sheets, the electrostatic latent images produced on the recording layers by the input signal are destroyed by the electrification produced by exfoliation, handling or friction. In this case, recording on a plurality of media is made possible by making the surfaces of the dielectric thin layers of highly-insulating material for record thereon uneven with a depth of 2 to 20 microns or by making the back surfaces of the papers used as the holders of said dielectric thin layers uneven with the same depth.

Furthermore, simultaneous record on a plurality of sheets is made possible by the use of a recording medium comprising a holder made of a paper or a film, a conductive layer of a surface resistance of $10^9$ to $10^{11}$ ohms provided on said holder, the electric conductivity in the direction of the volume of the conductive layer and the paper or film as one body being $10^{-6}$ to $10^{-9}$ mhos. per cm.$^2$, and a thin layer of highly-insulating material provided on said holder or by the use of a recording medium comprising a conductive layer as described above and thin layers of highly-insulating material holding therebetween said conductive layer.

Figure 16:
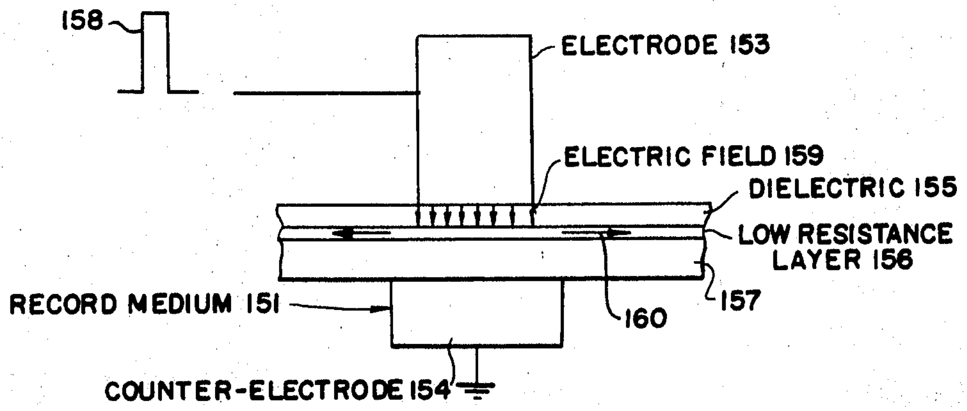

An embodiment of the recording medium of three layer structure is now described. As illustrated in FIG. 15, a single sheet of electrostatic recording medium 151 is placed between an electrode 153 having a pattern 152 and the corresponding counterelectrode 154 in such a manner that dielectric 155, the recording layer, may be in contact with the pattern electrode 153, and as illustrated in FIG. 16, electric input signal 158 is applied to pattern electrode 153 and counterelectrode 154 is grounded. Then electric field 159 of the shape of pattern 152 provided by pattern electrode 153 passes through recording medium 151 and an electrostatic latent image of the shape of the pattern is formed on the dielectric layer 155. Intermediate layer 156 of low resistance provided beneath the dielectric 155 operates to make most of the voltage of the input signal applied to dielectric layer 155 to thereby improve the performance of the recording medium.

Figure 17:
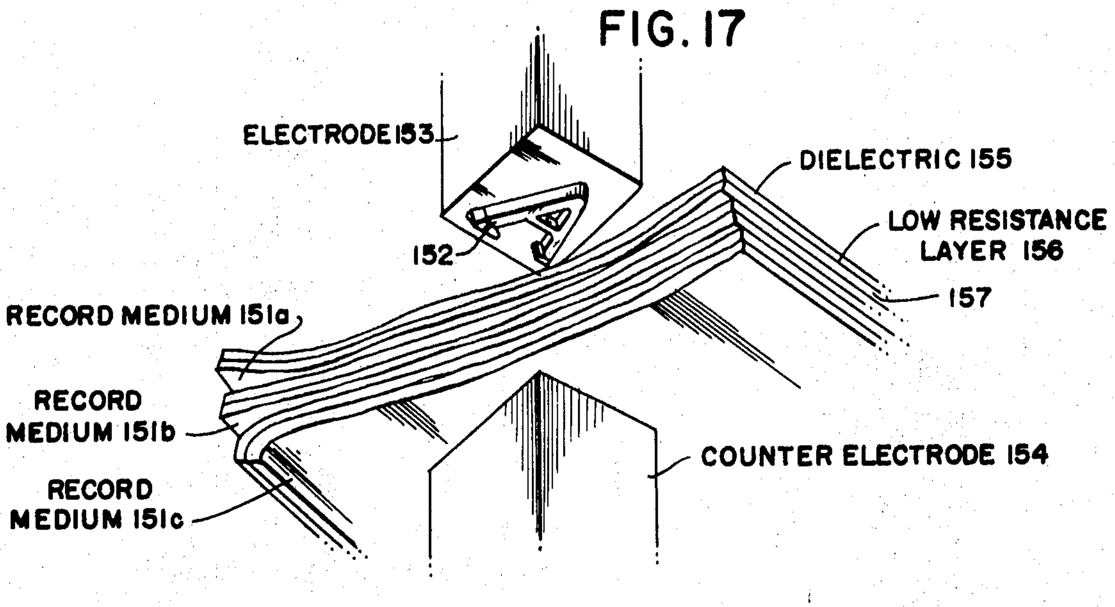

In the case of recording on only a single sheet as illustrated in FIGS. 15 and 16, it is sufficient if the resistance of layer 156 is lower than a certain value. But when the resistance is low, the electric charge is diffused within the intermediate layer 156 as shown by 160 and the electric charge is diffused within the intermediate layer 156 as shown by 160 and the electric field does not form the shape of the pattern when it has passed through the intermediate layer 156 of low resistance, so that when a plurality of, for example, three sheets of such electrostatic recording media are placed one upon another, as illustrated in FIG. 17, and the electric input signal is applied in the same manner as in FIG. 16, the electric field of the shape of pattern 152 is passed only to dielectric 155 of the first recording medium **151*a* and the electrostatic latent image is available only on medium 151*a***.

Figure 18:
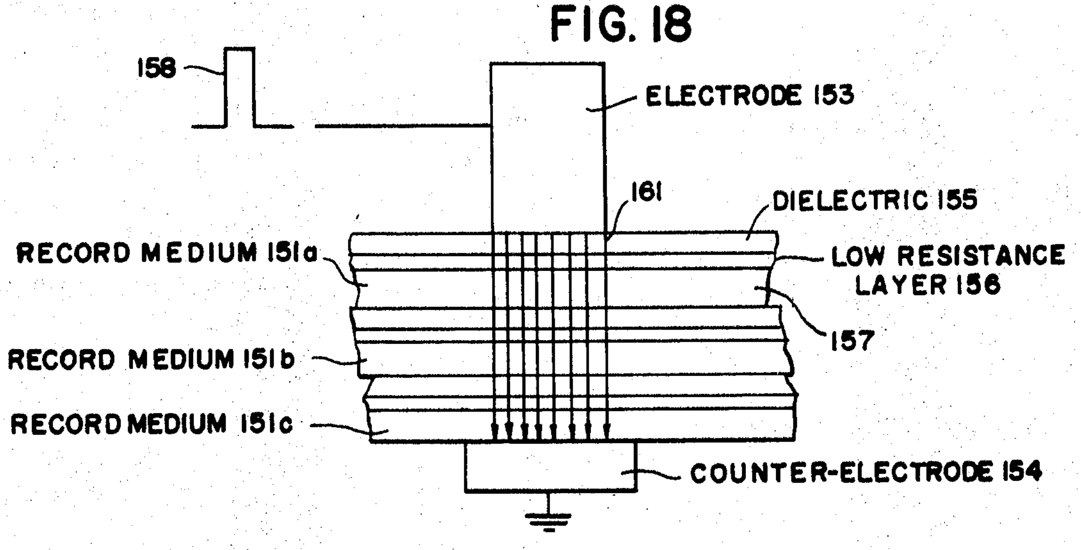

In order that the electrostatic latent images may be formed on all of the plurality of recording media, it is necessary that the electric field of the shape of the pattern should be passed through the media, as shown by 161 in FIG. 18, that is, it is necessary that the electric field should keep on having the shape of the pattern after it has passed through the intermediate layer 156 of low resistance in each of the recording media. Such a requirement is met if the plurality of electrostatic recording media have the following characteristic.

In a plurality of recording media for simultaneous record thereon, the intermediate layers of low resistance are provided not for the above purpose, but for the purpose of preventing the rising of the electric potential on both surfaces of the recording media caused by electrification due to exfoliation, handling or friction when separating the plurality of sheets into single sheets after the application of the input signal. In order that distinct electrostatic latent images of high resolving power may be formed simultaneously on all of a plurality of the recording media of three layers structure, each of which comprising a holder for giving stiffness to the recording medium, an intermediate layer of low resistance and a highly-insulating dielectric layer for record thereon, it is necessary that each of the volume resistance in the direction of the thickness of the three layers as a whole, the surface resistance of the dielectric, the surface resistance of the intermediate layer and the surface resistance of the back surface of the holder should be limited within a certain range.

The most favorable result was attained in the inventors' experiment, when the surface resistance of the dielectric measured as of a single sheet of dielectric was $10^{11}$ ohms to $10^{16}$ ohms, the surface resistance of the intermediate layer formed on the holder was $10^9$ to $10^{11}$ ohms, the surface resistance of the back surface of the holder was $10^{10}$ to $10^{13}$ ohms, the volume resistance in the direction of the thickness of the holder and the intermediate layer formed thereon as one body was $10^8$ to $10^{11}$ ohm-cm.$^2$ and the thickness of said one body was under 50 microns, and the volume resistance in the direction of the thickness of the three layers as one body was $10^9$ to $10^{12}$ ohm-cm.$^2$.

When the surface resistance of the dielectric for record thereon of the recording medium is an ohm, the volume resistance in the direction of the thickness of the recording medium as a whole is 6 ohm-cm.$^2$ and $a=K_b$, if $K>10$, distinct electrostatic latent images are available on all of the plurality of recording media, even if the time of application of the signal voltage of the electric input signal is short.

Figure 19:
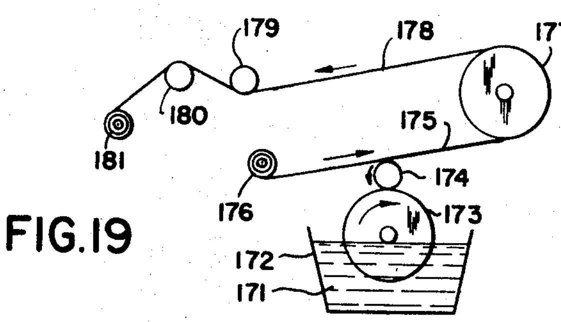
FIGS. 19 and 20 illustrate apparatus for forming the intermediate layer and the dielectric layer on the paper.

An example of the materials for an electrostatic recording medium of the above-described structure and the method of manufacturing such a medium will be described. A mixture of lithium chloride and polyvinyl alcohol is painted as the low resistance layer on the holder made of a special carbon paper of the thickness of 20 microns, and polycarbonate or styrene is painted as the dielectric on said low resistance layer. The low resistance intermediate layer is produced by the method illustrated in FIG. 19. A solution of mixture of lithium chloride of under 3% and polyvinyl alcohol of 5% in water 171 is put in bath 172.

Drum 173, about half of which is dipped in bath 172, is rotated in the arrow-marked direction, so that the solution 171 attached to drum 173 may be brought up and delivered to roller 174. The roller gap between roller 174 and drum 173 may be adjusted between 45 and 180 microns, thus enabling the adjustment of the quantity of solution 171 to be painted. The special carbon paper 175 which is to constitute the holder of the recording medium is in contact with the upper part of roller 174 and solution 171 attached to roller 174 is painted on the paper. Paper 175 is supplied from roller 176 and is fed in the arrow-marked direction and is placed in contact with roller 174 where solution 171 is painted on the paper and then the paper comes into contact with drying roller 177 to be dried.

Figure 20:
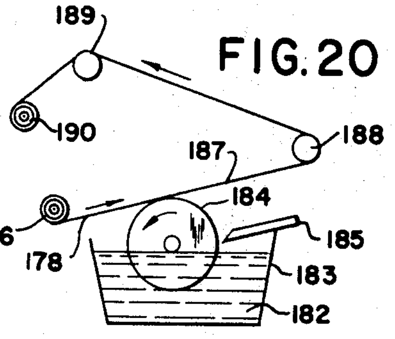

Drying roller 177 is heated at a temperature of 60° C. to 70° C. by hot air. Paper 178, on which the low-resistance layer has been formed by drying solution 171, passes rollers 179 and 180 and is rolled by 181. Then the dielectric layer for record thereon is formed by the method illustrated in FIG. 20. A 5% solution of polycarbonate in dichloromethane dioxane as solvent or a 5% solution of styrene in toluene 182 is put in bath 183. Drum 184 about half of which is dipped in bath 183 is rotated in the arrow-marked direction so that the solution 182 attached to the drum may be brought up and painted on paper 178 having a low resistance layer formed thereon and in contact with the upper part of the drum.

A doctor knife 185 is held along the bus of drum 184 with the doctor gap of 100 microns, to control the quantity of solution 182 to be painted. Thus, paper 187, which was supplied from 186, and was painted with solution 182 through contact with drum 184, then passes rollers 188 and 189 and is rolled by 190. The paper is dried by hot air as it passes between rollers 188 and 189 and the recording layer of polycarbonate or styrene is formed on the paper.

Figure 21:
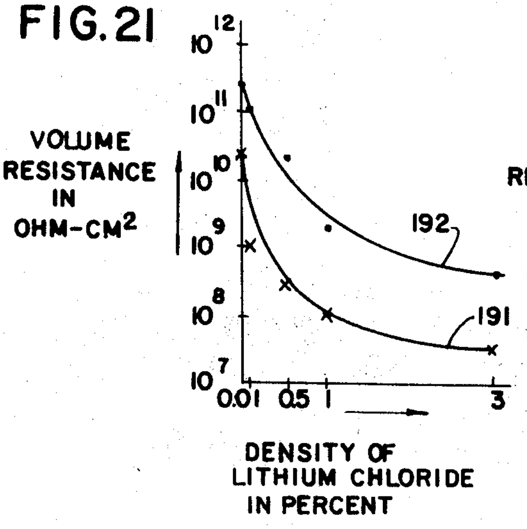
FIGS. 21 and 22 are graphical presentations illustrating the relation between lithium chloride in the intermediate layer painted beneath the dielectric layer and the volume resistance and the relation between the lithium chloride and the surface resistance.
Figure 22:
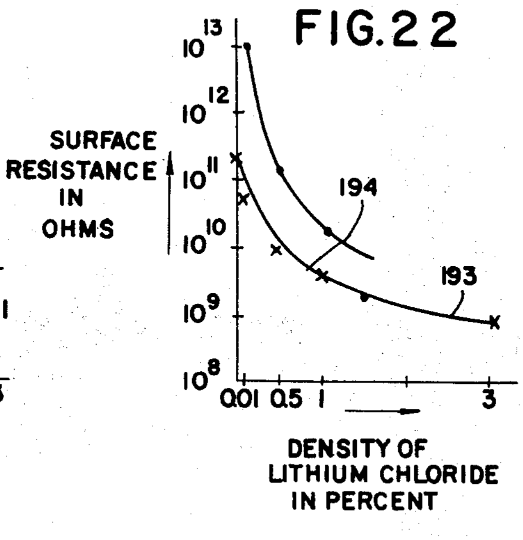

The volume resistance in the direction of the thickness of the paper on which only the intermediate layer has been formed and the volume resistance in the direction of the thickness of the paper on which the polycarbonate layer has further been formed vary as shown by curves 191 and 192, respectively in FIG. 21, in accordance with the quantity of lithium chloride in the intermediate layers. Also, the surface resistance of the intermediate layer available when only the intermediate layer has been formed on the paper and the surface resistance available when the polycarbonate layer has been added vary as shown by curves 193 and 194, respectively, in FIG. 22, in accordance with the quantity of the lithium chloride.

It was found that when a plurality of electrostatic recording media produced by the above-described method are placed between the electrodes and the electric input signal is applied, records are not available unless the quantity of the lithium chloride is under 1.0%. This is consistent with the fact that the resistance within the above-mentioned ranges are available when the lithium chloride is within a range of less than 1%.

Some embodiments of the recording method of this invention will now be described.

EMBODIMENT 1

A plurality of electrostatic recording media for simultaneous record thereon, as described above, are applicable to recording in fasimile transmission, etc. As shown in FIG. 23, a voluntary number of electrostatic recording media 252 for simultaneous record thereon, as described above, are rolled one upon another on a metallic scanning cylinder 251, and a metallic recording needle 253 is attached always in contact with the recording medium at an appropriate pressure. As the scanning cylinder 251 is rotated, recording needle 253 is moved in the axial direction of the cylinder at an appropriate speed, so that the recording meduim 252 may be scanned all over. The picture signals which are sent by line 254 are passed through amplifier 255 and rectifier 256 and are applied as variation of the voltage on recording media 252 through recording needle 253.

Then, the voltages of the picture signals which are larger then the critical voltage produce an electrostatic latent image on each of the recording media 252. When the scanning is finished, recording media 252 are removed from scanning cylinder 251 and are separated into single sheets, and then visible images are available on the recording media by the use of the method of powder developing by electrostatic adsorption, which is utilized in electronic photograph, or other methods.

Furthermore, if a voltage of the opposite polarity to the voltage given by the picture signal and exceeding the critical voltage of the plurality of recording media, is applied in advance to the recording media 252 through a preceding electrode 257 which is in contact with the recording medium 252, record is available by the following application of the picture signal of a voltage lower than the voltage which would be needed if the recording media were uncharged, that is, without the preceding history.

For example, a recording medium was produced by painting a solution of trimethyl palmityl ammonium chloride thinly on the back surface of a Mylar film of the thickness of 12.7 microns and drying it and adjusting the surface resistivity of said back surface to be between $10^{12}$ and $10^{13}$ ohms, and three sheets of these recording media were rolled on the scanning cylinder and the amplified and rectified voltage of the picture signal was applied to the recording needle at 1500 volts. A distinct electrostatic latent image of high resolving power was then available on each of the recording media and visible images were obtained by the use of the developer which is used for developing the positive latent image in the electronic photograph.

Completely the same electrostatic latent images were available by applying a picture signal voltage of +500 volts upon +1000 volts DC, by always applying −1000 volts DC to the scanning cylinder and applying +500 volts through the recording needle, by applying a picture signal of +500 volts after the application of −1000 volts as a previous history on all of the three sheets of recording media through the preceding electrode, or by applying an unrectified picture signal voltage of 1000 volts peak-to-peak AC wave from after the application of −1000 volts DC as previously on all of the three sheets of recording media through the preceding electrode.

This means that the same result is available by making the sum of DC voltage under the critical voltage and the picture signal voltage higher than the critical voltage, as described before with reference to FIGS. 2 to 5. It is obvious that the DC voltage may also be applied to the side of the drum as a bias, making it polarity opposite to that of the picture signal voltage and that the picture signal voltage may be made lower for this. Also, in general, signals in facsimile transmission, etc., are transmitted in AC waveform, so that when the electrostatic recording method is used in the facsimile transmission system, the signals are led to the recording needle after they are amplified by an amplifier and are rectified, as illustrated in FIG. 23.

Figure 24:
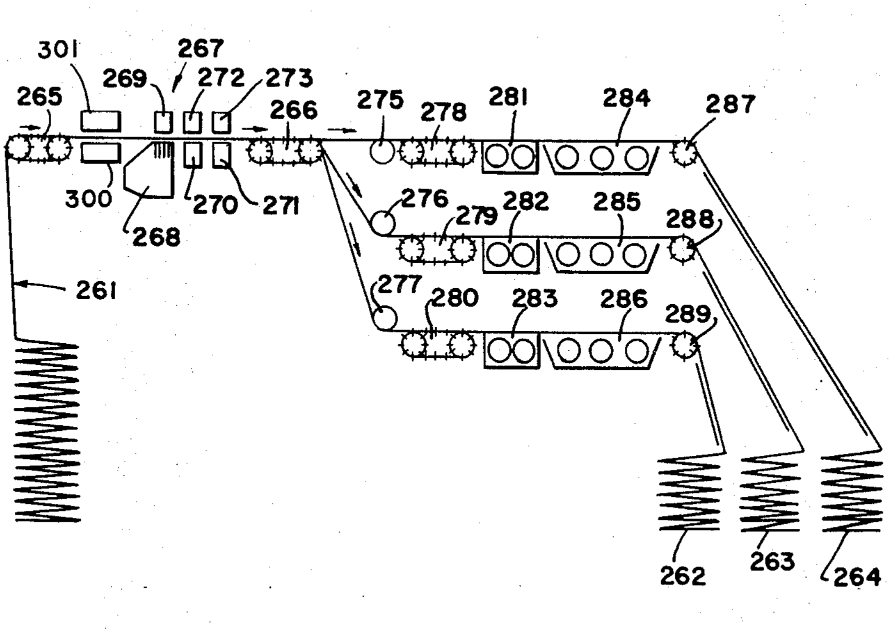

As shown in FIG. 24, when a single dielectric film is used as the recording medium and a voltage is reapplied to an area of the film to which a voltage of the same polarity has been applied as previously, a new movement of the charged carrier is not caused unless the second voltage is larger than the first voltage. Therefore, if a voltage of the opposite polarity to the electrostatic latent image to be produced and of larger value than the voltage of the picture signal, is applied to the recording media all over as previously, the picture signal may be applied in AC waveform as it is and not in rectified waveform, and, as a result, electrostatic charge images of the opposite polarity to the voltage previously aplied are available.

EMBODIMENT 2

Figure 26:
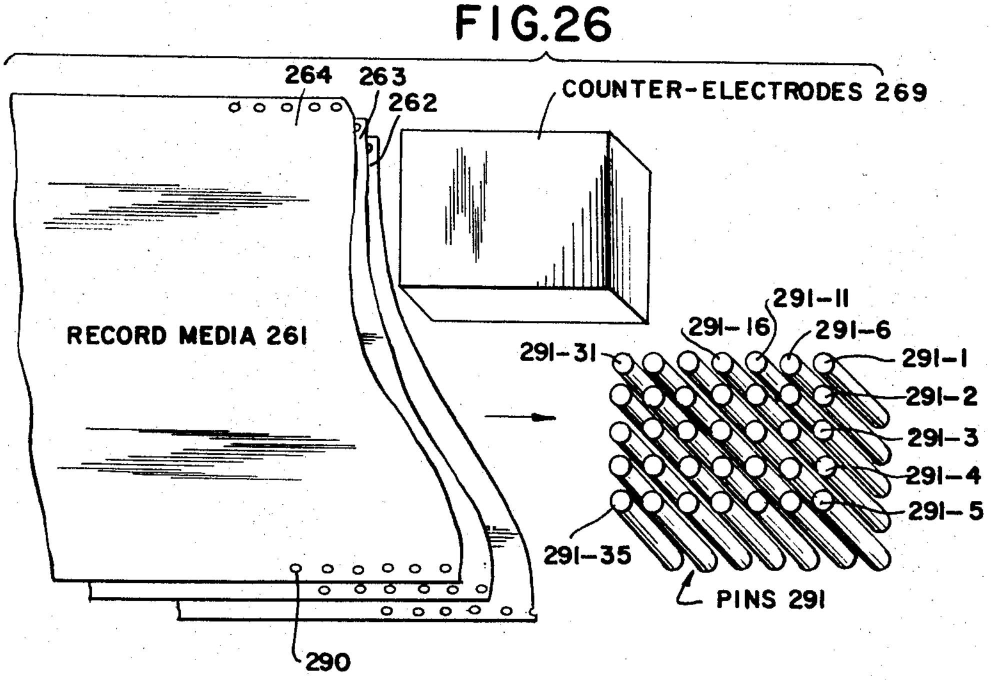
FIGS. 24 to 26 are schematic diagrams illustrating the application of the apparatus and method of present invention to the output printer of an information or data processing machine.
Figure 25:
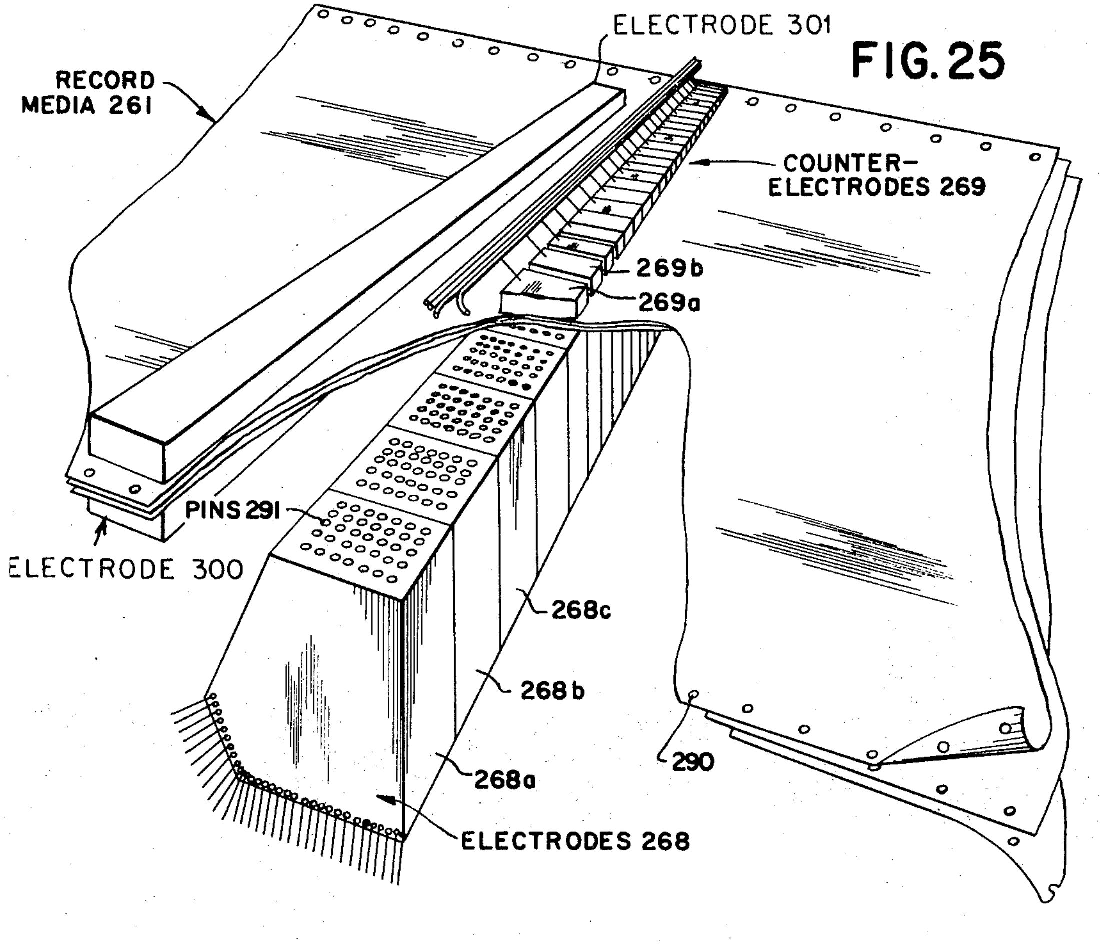

An example of the application of the invention to the output printer of an information processing machine is illustrated in FIGS. 24 to 26. Reference numeral 261 indicates three sheets of the recording media, in accordance with the invention, placed one upon another in such a manner that the recording surfaces of the recording media are in the same direction. Reference numerals 262, 263 and 264 indicate the individual recording media. Recording media 261 are moved in the arrow-marked direction by providing feed holes 290 opened along both edges of each recording medium in engagement with the driving devices 265 and 266 provided with sprockets. The recording part 267 is provided between the driving devices 265 and 266.

The first precharging voltage is supplied to record medium 261 through preceding electrodes 300 and 301, positioned in front of the electrodes 268, 269, 270, 271, 272, 273, and so on. The critical voltage of the record medium 261 is thereby decreased. The electrodes 268, 269, 270, 271, 272, 273, and so on, positioned thereafter, may accordingly provide electrostatic recording of the intelligence. The recording part comprises a matrix electrode part 268, each unit of which forms a letter by the selection of 25 pins, and fixed letter electrode parts 270 and 271. Matrix electrode part 268 comprises a voluntary number of electrode units, $m_1$, $m_2$, $m_3$ . . . placed side by side beneath the recording media 261 in the direction of the depth in FIG. 24, or as illustrated in FIG. 25.

It is obvious that pins 291 are electrically insulated from each other. Upon the recording media 261, planar counter electrodes, $l_1$, $l_2$ . . . $l_r$ (269) are provided, which correspond to electrode units, $m_1$, $m_2$ . . . $m_r$, and are electrically insulated from each other.

Since the shapes of the letters which may be formed by selecting the pins of matrix electrodes 268 are limited, fixed letter electrode parts 270 and 271, having letter patterns, are provided voluntarily in parallel with the group of matrix electrodes, for the purpose of replacement. Letter electrodes 272 and 273, which correspond to electrodes 270 and 271, are provided on the recording media 261. Metallic pins 291 set at equal spaces, as shown in FIG. 26, in each of the electrode units, $m_1$, $m_2$ . . . $m_r$, of the matrix electrode part 268, are referred to by reference characters $a_1$, $a_2$, $a_3$ . . . $a_{35}$, and all the pins referred to by the same reference characters in all of the electrode units are connected in parallel.

In an information or data processing machine, pins are selected to form letters in accordance with the information or data which have been transmitted, and an amplified and rectified voltage is applied to the pins. Simultaneously, counter electrodes $l_1$, $l_2$ . . . $l_r$, (269) are controlled to apply a voltage of the opposite polarity to the voltage applied to the pins of the matrix electrodes. On this occasion, if the above two voltages are so selected that the voltage applied to the matrix electrode part 268 alone is not high enough to produce electrostatic latent images on the recording media 261, that is, said voltage is made lower than the critical voltage of the recording mediums 261, and it is not before the voltage applied to the counterelectrode 269 is added that the critical voltage is exceeded and thus record is made possible on the figure concerned, then it is made possible to properly select the voltage to be applied to each of the counterelectrodes, $l_1$, $l_2$ . . . $l_r$, (269) and produce electrostatic latent images only on the corresponding figure. Recording media 261 on which the electrostatic latent images of the letters formed by the pin matrixes have been thus produced are fed forward.

When the recording media 261 arrive at the fixed letter electrode parts 270 and 271 and the corresponding letter counterelectrodes 272 and 273, the signal voltage is applied to produce the electrostatic latent images of the letters which cannot be formed by the pin matrices. Fixed letter electrodes 270 and 271 are all electrically connected like the pins of the pin matrix electrodes, so that if the voltage applied to the fixed letter electrodes alone is not high enough to produce electrostatic latent images on the recording media 261, that is, said voltage is made lower than the critical voltage or said voltage is made 0 and letter counterelectrodes 272 and 273 are selected and a voltage capable of producing electrostatic latent images is applied to electrodes 272 and 273, that is, the total potential difference is made lager than the critical voltage, then the electrostatic latent images of the patterns of the letter electrodes are available.

The recording media are then separated into single sheets by guide rollers 275, 276 and 277 and are fed by driving devices 278, 279 and 280, and visible images are formed on the recording media at the developing part 281, 282 and 283 which use the magnetic brush method and are heated and fixed at the fixation parts 284, 285 and 286. The recording media are then further fed by driving rollers 287, 288 and 289, and thus the operation is finished.

When three sheets of recording media, each of which comprising a matted tracing paper of a thickness of 40 microns or a carbon paper of a thickness of 35 microns, and a thin layer of styrene or polycarbonate of a thickness of 2 microns painted on the paper, placed one upon another, were used and +800 volts was applied to the matrix electrodes or the letter electrodes and −1300 volts was applied to the counterelectrodes or the letter counterelectrodes, and the intervals between the signal voltages were made 25 microminutes, then electrostatic latent images were obtained on each of the recording media 262, 263 and 264 and they were changed into distinct visible images by powder developing.

While the invention has been described by means of specific examples and in specific embodiments, we do not wish to be limited thereto, for obvious modifications will occur to those skilled in the art without departing from the spirit and scope of the invention.

We claim:

1. Electrostatic recording apparatus for recording facsimile intelligence, comprising:

a plurality of record media in juxtaposed relation to each other;

recording electrode means positioned in operative proximity with said record media at one surface thereof for electrostatically recording facsimile intelligence in said record media;

counterelectrode means positioned in operative proximity with said record media at the opposite surface thereof opposite said recording electrode means;

preceding electrode means positioned in front of said recording electrode means and said counterelectrode means;

energizing circuit means connected to said preceding electrode means for applying a first precharging voltage of predetermined polarity and a magnitude dependent upon the number and electrical characteristics of record media in said plurality of record media; and energizing circuit means connected to said recording electrode means and to said counterelectrode means for applying between said recording electrode means and said counterelectrode means a second charging voltage of polarity opposite to said predetermined polarity, said second charging voltage being sufficient for electrostatically recording facsimile intelligence simultaneously in each of said plurality of record media.

2. Electrostatic recording apparatus as claimed in claim 1, wherein said first voltage has a magnitude which is sufficient to electrostatically record facsimile intelligence in said record media.

3. Electrostatic recording apparatus as claimed in claim 1, wherein said energizing circuit means applies between said preceding electrode means and said counterelectrode means a first precharging voltage of predetermined polarity and a magnitude dependent upon the number and electrical characteristics of record media in said plurality of record media, said first voltage having a magnitude which is insufficient to electrostatically record facsimile intelligence in said record media, and for applying between said recording electrode means and said counterelectrode means a second charging voltage of polarity opposite to said predetermined polarity, the combination of said first and second voltages being sufficient for electrostatically recording facsimile intelligence simultaneously in each of said plurality of record media.

4. Electrostatic recording apparatus as claimed in claim 2, wherein said second voltage is an AC voltage and has a magnitude less than that of said first voltage.

5. Electrostatic recording apparatus as claimed in claim 1, wherein said energizing circuit means applies to said preceding electrode means a first precharging voltage of predetermined polarity and a magnitude dependent upon the number and electrical characteristics of record media in said plurality of record media, said first voltage having a magnitude which is insufficient to electrostatically record a facsimile intelligence in said record media, and for applying to said counterelectrode means a second charging voltage of polarity opposite to said predetermined polarity, the combination of said first and second voltages being sufficient for electrostatically recording facsimile intelligence simultaneously in each of said plurality of record media.

6. Electrostatic recording apparatus as claimed in claim 5, wherein said second voltage has a magnitude greater than that of said first voltage.

7. A method for electrostatic recording of facsimile intelligence, comprising the steps of:

positioning a plurality of record media in juxtaposed relation to each other between a recording electrode positioned in operative proximity with said record media at one surface thereof for electrostatically recording facsimile intelligence in said record media and counterelectrode positioned in operative proximity with said record media at the opposite surface thereof opposite said recording electrode and between a preceding electrode positioned in front of said recording electrode and said counterelectrode;

applying between said preceding electrode and said counterelectrode a first precharging voltage of predetermined polarity and a magnitude dependent upon the number of electrical characteristics of record media in said plurality of record media and having a predetermined magnitude; and applying between said recording electrode and said counterelectrode a second charging voltage of polarity opposite to said predetermined polarity, said second charging voltage being sufficient for electrostatically recording facsimile intelligence simultaneously in each of said plurality of record media.

8. A method for electrostatic recording as claimed in claim 7, wherein said first voltage has a magnitude which is sufficient to electrostatically record facsimile intelligence in said record media and said second voltage corresponds to said facsimile intelligence thereby electrostatically recording facsimile intelligence in each of said plurality of record media.

9. A method for electrostatic recording as claimed in claim 7, wherein said first voltage has a magnitude which is insufficient to electrostatically record facsimile intelligence in said record media and the combination of said first and second voltages is sufficient for electrostatically recording facsimile intelligence simultaneously in each of said plurality of record media.

10. A method for electrostatic recording as claimed in claim 8, wherein said second voltage is an AC voltage and has a magnitude less than that of said first voltage.

References Cited

UNITED STATES PATENTS

| | | | |
|---|---|---|---|
| 3,130,411 | 4/1964 | Schwertz | 346—74 |
| 3,354,464 | 11/1967 | Tsukatani et al. | 346—74 |

STANLEY M. URYNOWICZ, Jr., Primary Examiner
G. M. HOFFMAN, Assistant Examiner

U.S. Cl. X.R.

101—426; 178—6.6; 250—49.5